(12) United States Patent
Bowers et al.

(10) Patent No.: US 10,136,437 B2
(45) Date of Patent: *Nov. 20, 2018

(54) AUTOMATICALLY ADJUSTABLE RADIOFREQUENCY LINK

(71) Applicant: Elwha LLC, Bellevue, WA (US)

(72) Inventors: Jeffrey A. Bowers, Bellevue, WA (US); Alistair K. Chan, Bainbridge Island, WA (US); Russell J. Hannigan, Sammamish, WA (US); Roderick A. Hyde, Redmond, WA (US); Jordin T. Kare, San Jose, CA (US); Nathan Kundtz, Kirkland, WA (US); Nathan P. Myhrvold, Bellevue, WA (US); John Brian Pendry, Cobham (GB); David R. Smith, Durham, NC (US); Clarence T. Tegreene, Mercer Island, WA (US); David B. Tuckerman, Lafayette, CA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,659

(22) Filed: Nov. 20, 2017

(65) Prior Publication Data
US 2018/0077711 A1    Mar. 15, 2018

Related U.S. Application Data

(63) Continuation of application No. 15/402,776, filed on Jan. 10, 2017, now Pat. No. 9,826,534, which is a
(Continued)

(51) Int. Cl.
*H04B 15/00* (2006.01)
*H04B 17/00* (2015.01)
(Continued)

(52) U.S. Cl.
CPC .......... *H04W 72/0453* (2013.01); *H04B 1/02* (2013.01); *H04B 1/1027* (2013.01);
(Continued)

(58) Field of Classification Search
CPC ............... H04B 1/1027; H04B 1/1081; H04B 2001/1072; H04B 1/02; H04W 72/0453;
(Continued)

(56) References Cited

U.S. PATENT DOCUMENTS 6,006,110 A    12/1999 Raleigh
6,025,795 A    2/2000 Hulderman et al.
(Continued)

OTHER PUBLICATIONS

Belcher,Extremely High Frequency (EHF) Low Probability of Intercept (LPI) Communication Applications, Naval Postgraduate School Thesis, Mar. 1990, 3 pages.
(Continued)

*Primary Examiner* — Nhan Le
(74) *Attorney, Agent, or Firm* — Foley & Lardner LLP

(57) ABSTRACT

An automatically adjustable radiofrequency link system includes a radiofrequency transmitter configured to transmit a signal at a frequency of transmission within an extremely high frequency (EHF) band. The system further includes a receiving device configured to receive the transmitted signal and provide feedback to a processing circuit communicatively coupled to the transmitter and the receiving device, wherein the feedback is related to the received signal. The processing circuit is configured to determine required signal properties based on the feedback and determine signal loss properties including an effect of atmospheric absorption, as a function of frequency; determine a modification to the transmitted signal using the signal loss properties and the
(Continued)

required signal properties; and adjust the frequency of transmission to obtain a desired transmission signal using the modification.

20 Claims, 9 Drawing Sheets

Related U.S. Application Data continuation of application No. 14/853,049, filed on Sep. 14, 2015, now Pat. No. 9,549,406.

(51) Int. Cl.
| | |
|---|---|
| H04W 72/04 | (2009.01) |
| H04B 1/02 | (2006.01) |
| H04B 1/10 | (2006.01) |
| H04L 1/00 | (2006.01) |

(52) U.S. Cl.
CPC ......... *H04B 1/1081* (2013.01); *H04L 1/0026* (2013.01); *H04B 2001/1072* (2013.01)

(58) Field of Classification Search
CPC ........... H04W 28/0236; H04W 72/082; H04W 72/085; H04W 52/12; H04W 52/20
See application file for complete search history.

(56) References Cited

U.S. PATENT DOCUMENTS

| | | | |
|---|---|---|---|
| 6,229,797 B1* | 5/2001 | Cho | H04B 1/707 333/12 |
| 6,272,351 B1 | 8/2001 | Langston et al. | |
| 6,614,854 B1* | 9/2003 | Chow | H04L 1/0016 330/302 |
| 8,184,724 B2 | 5/2012 | Yamamoto et al. | |
| 8,442,568 B2 | 5/2013 | Chen et al. | |
| 9,077,415 B2 | 7/2015 | Josiam et al. | |
| 9,197,306 B2* | 11/2015 | Wang | H04B 7/0404 |
| 9,549,406 B1* | 1/2017 | Bowers | H04L 1/00 |
| 9,698,845 B2* | 7/2017 | Talty | H04B 1/3822 |
| 9,762,274 B2* | 9/2017 | Rai | H04B 1/12 |
| 2006/0068719 A1 | 3/2006 | Hairapetian | |

OTHER PUBLICATIONS

Diederichs et al., "EHF Appliques for VHF Radios", Hughes Aircraft Company, 1990, 17 pages.
Gary, Tutorial on Airborne Microwave Temperature Profilers, Chapter 5: Atmospheric Emission Sources, http://brucegary.net/MTP_tutorial/MTP_ch5.html, last update: Jun. 22, 2007, 11 pages.

* cited by examiner though, for the purpose of illustration in the present disclosure, specific methods, devices, and systems are described, it is understood that the subject matter presented here is not limited by the illustrated methods, devices, and systems.

AUTOMATICALLY ADJUSTABLE RADIOFREQUENCY LINK

CROSS-REFERENCE TO RELATED APPLICATIONS

The present application is a continuation of application Ser. No. 15/402,776, filed Jan. 10, 2017, which is a continuation of application Ser. No. 14/853,049, filed Sep. 14, 2015, each of which is incorporated herein by reference in its entirety.

BACKGROUND

Extremely high frequency (EHF) is a form of electromagnetic radiation that ranges in frequencies from 30 to 300 GHz. The EHF band is also known as the millimeter wave band, as radio waves within this band have wavelengths from 1 to 10 millimeters. Radio signals in this band are extremely prone to atmospheric attenuation. In particular, signals in the 57-64 GHz range are absorbed by oxygen molecules, which limits propagation of EHF signals in this frequency range to a few kilometers. As such, the FCC has made the 57-64 GHz band available for use by unlicensed devices. The actual absorption coefficient (signal attenuation per kilometer) depends on the signal frequency and on certain atmospheric conditions, including humidity, barometric pressure, and presence and type of precipitation.

SUMMARY

One embodiment relates to an automatically adjustable radiofrequency link system that includes a radiofrequency transmitter configured to transmit a signal at a frequency of transmission within an extremely high frequency (EHF) band. The system further includes a receiving device configured to receive the transmitted signal and provide feedback to a processing circuit communicatively coupled to the transmitter and the receiving device, wherein the feedback is related to a property of the received signal. The processing circuit is configured to determine required signal properties based on the feedback; determine signal loss properties including an effect of atmospheric absorption, as a function of frequency; determine a modification to the transmitted signal using the signal loss properties and the required signal properties; and adjust the frequency of transmission to obtain a desired transmission signal using the modification.

Another embodiment relates to a method for automatically adjusting a radiofrequency link. The method includes: transmitting, by a radiofrequency transmitter, a radiofrequency signal at a frequency of transmission within an extremely high frequency (EHF) band; receiving, by a receiving device, the transmitted signal; providing, by the receiving device, feedback to a processing device communicatively coupled to the radiofrequency transmitter and the receiving device, wherein the feedback is related to the received signal; determining, by the processing device, required signal properties based on the feedback; determining, by the processing device, signal loss properties including an effect of atmospheric absorption, as a function of frequency; determining, by the processing device, a modification to the transmitted signal using the signal loss properties and the required signal properties; and adjusting, by the processing device, the frequency of transmission to obtain a desired transmission signal using the modification.

Another embodiment relates to a non-transitory computer-readable medium having instructions stored thereon, the instructions forming a program executable by a processing circuit to cause the processing circuit to perform operations comprising: transmitting, by a radiofrequency transmitter, a radiofrequency signal at a frequency of transmission within an extremely high frequency (EHF) band; receiving, by a receiving device, the transmitted signal; providing by the receiving device, feedback to a processing device communicatively coupled to the radiofrequency transmitter and the receiving device, wherein the feedback is related to the received signal; determining, by the processing circuit, required signal properties based on the feedback; determining by the processing device, signal loss properties including an effect of atmospheric absorption, as a function of frequency; determining, by the processing device, a modification to the transmitted signal using the signal loss properties and the required signal properties; and adjusting, by the processing device, the frequency of transmission to obtain a desired transmission signal using the modification.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
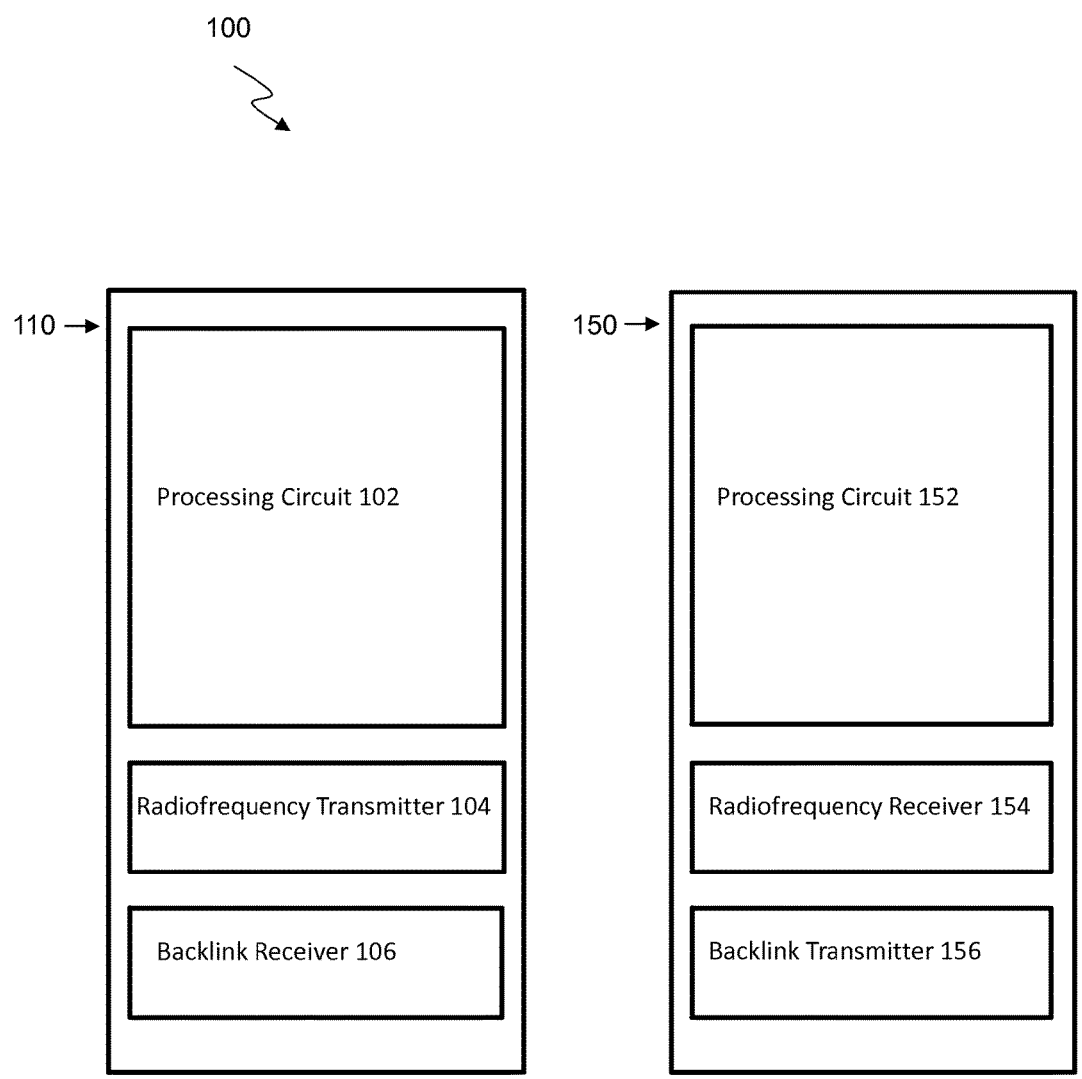
FIG. 1 is a block diagram of a system for automatically adjusting a radiofrequency link according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments for automatically adjusting a radiofrequency link are shown and described. Electromagnetic radiation of wavelengths within the extremely high frequency (EHF) band are preferentially absorbed by the atmosphere as a function of wavelength. In particular, signals in the 57-64 GHz range are absorbed by oxygen molecules in the atmosphere. The FCC has made the 59-64 GHz band available for unlicensed use, and this range is suitable for short-range, high data rate, broadband applications, such as wireless computer-to-computer communications. Due to the atmospheric attenuation of waves in the EHF band, the propagation distances of these frequencies are often relatively short (e.g., a few kilometers), and due to the short wavelength of these frequencies, they can be transmitted in narrow beams. This combination of limited range and narrow beams means the potential for interference with another transmission is minimal. A transmission device including a radiofrequency transmitter and a processing circuit (e.g., an embedded processor, a computer, an external controller, etc.) may be used to transmit EHF waves to establish a communications link. By monitoring the received signal and adjusting the frequency of the transmission based on atmospheric absorption characteristics, various properties of the communications link and various properties (e.g., characteristics) of the transmitted wave may be optimized and adjusted. Properties/characteristics include but are not limited to signal strength and error rate.

Referring to FIG. 1, a block diagram of a system 100 for automatically adjusting a radiofrequency link is shown. According to an embodiment, system 100 includes a transmitter 110 for transmitting an EHF band radiofrequency signal, a receiver 150 for receiving the EHF band radiofrequency signal, and a processing circuit 102, 150 to monitor the EHF band radio frequency signal communicated between the transmitter 110 and the receiver 150.

The transmitter 110 includes the processing circuit 102, a radiofrequency transmitter 104, and a back link receiver 106. In an embodiment, the transmitter 110 includes all components necessary to generate and transmit a radiofrequency signal within the EHF band (e.g., electronic signal processors, electronic circuitry, a power supply, an amplifier, an antenna, etc.). For example, the radiofrequency transmitter 104 generally modulates a constant-frequency signal (i.e., the RF carrier) with an information or communication signal to be carried with the output radio frequency signal (i.e. the transmitted signal). The radiofrequency transmitter 104 may modulate the carrier signal according to a number of methods, including amplitude modulation, frequency modulation, pulse modulation, phase modulation, etc.

In some embodiments, the transmitter 110 may also transmit one or more additional signals configured to aid in measuring characteristics of a transmission path. For example, the transmitter 110 may transmit a constant signal or supervisory signal via a supervisory channel to be used as a comparison at a minimum or maximum attenuation frequency to determine if future changes to a characteristic (e.g., frequency, power) of the radiofrequency signal are necessary. The supervisory or constant signal strength can be compared to a threshold or reference value to determine if environmental reasons, such as heavy rain or fog, and not changes in the transmitter output, are response for changes to the primary signal strength. The back link receiver 106 of the transmitter 110 includes all components necessary to receive a feedback signal from the back link transmitter 156 on the receiver 150 (e.g., an antenna, signal processing components, etc). The feedback signal may be in the form of digital or analog information sent via RF (radio), or may be, e.g., digital data sent via the internet or another separate data link; in the latter case the back link receiver would comprise an interface to the internet or the data link.

The receiver 150 includes the processing circuit 152, a radiofrequency receiver 154, and a back link transmitter 156. In an embodiment, the receiver 150 includes all components necessary to receive a signal within the EHF band (e.g., an antenna, signal processing components, etc.). The radiofrequency receiver 154 may be configured to receive and demodulate the primary signal associated with the EHF link, e.g., the receiver for the high-bandwidth digital data in a digital data link. Alternatively, the radiofrequency receiver 154 may be a secondary receiver configured to receive the primary signal but not fully demodulate it (for example, to demodulate only a low-bandwidth component of the full signal) or to receive an additional signal such as a constant signal or supervisory signal sent by the transmitter 110. In either case, the radiofrequency receiver 154 produces one or more outputs that the processing circuit 102, 152 can analyze to determine properties associated with the primary signal (e.g., received signal strength, noise level, error rate, etc.) to adjust the transmission of the radiofrequency signal. The back link transmitter 156 of the receiver 150 includes all components necessary to generate and transmit a signal (e.g., electronic signal processors, electronic circuitry, a power supply, an amplifier, an antenna, etc.) to the back link receiver 106 on the transmitter. As noted above, the feedback signal may be in the form of digital or analog information sent via RF (radio), or may be, e.g., digital data sent via the internet or a separate data link; in the latter case the back link transmitter would comprise an interface to the internet or data link.

As illustrated in FIG. 1, the processing circuit 102, 152 can be a component of either the transmitter 110, the receiver 150, or both. In some embodiments, the processing circuit 102, 152 is in communication with (e.g., communicatively coupled) to the transmitter 110 or the receiver 150, with or without such components being physically associated with/coupled to one another. The processing circuit 102, 152 monitors the output of the radiofrequency receiver 154 and controls one or more operating characteristics of radiofrequency transmitter 104 including the transmitter operating frequency. In some embodiments, the processing circuit 102, 152 monitors the output of the backlink receiver 106 and controls one or more operating characteristics of backlink transmitter 156.

The processing circuit 102, 152 responds to information from the receiver 150 and generates signals necessary to instruct the transmitter 110 to adjust the frequency of the transmission in order to optimize a property of the transmission, or to optimize a property of system 100. For example, the processing circuit 102, 152 may adjust the transmitted frequency in order to minimize potential interference caused by the signal and/or minimize chances of interception of the signal, while maintaining a specified received signal strength.

In some embodiments, the processing circuit 102, 152 may have two or more operating modes, corresponding to different operating situations. For example, in one operating mode, to establish an initial connection with a receiving device, the processing circuit 102 may command that the radiofrequency signal be transmitted with the greatest possible signal strength at a predetermined frequency having minimum atmospheric absorption.

For example, in another operating mode, after a connection is established, the processing circuit 102, 152 may decrease the strength of the radiofrequency signal or adjust the frequency (or otherwise adjust the signal) based on atmospheric absorption characteristics and feedback provided by the receiving device (e.g., receiver 150). The processing circuit 102, 152 may also adjust the signal to optimize the power usage of system 100 during the transmission. In general, processing circuit 102, 152 bases adjustments applied to the radiofrequency transmitter 104 on the atmospheric absorption characteristics corresponding to the frequency of the transmitted signal.

For example, in another operating mode, the processing circuit 102, 152 may be provided information indicating that there is little or no risk of communications being intercepted or otherwise compromised (e.g., the system 100 is operating in "friendly territory"). Such information may be provided as part of feedback from the receiving device (e.g., receiver 150), or from a source remote from the system 100. Accordingly, the processing circuit 102, 152 may adjust the signal to operate at a frequency corresponding to relatively low or minimum absorption, and/or to optimize the power usage of system 100. In contrast, in another operating mode, the processing circuit 102, 152 may be provided information indicating that there is risk of communications being intercepted or otherwise compromised (e.g., the system 100 is operating in "enemy territory"). Such information may be provided as part of feedback from the receiving device (e.g., receiver 150), or from a source remote from the system 100. Accordingly, the processing circuit 102, 152 may adjust the signal to operate at a frequency corresponding to relatively high or maximum absorption, and/or to minimize the range of the signal, for example so that the receiver 150 is located at a maximum range of the signal so that no enemy receiver further from the transmitter 110 than the receiver 150 is capable of intercepting the signal.

In an embodiment, the radiofrequency transmitter 104 is a transmitter configured to transmit a signal over a range of frequencies, for example, between 57 GHz and 64 GHz. The processing circuit 102, 152 analyzes the rate of atmospheric absorption due to oxygen molecules. The processing circuit 102, 152 actively tunes the frequency of the transmitted signal based on the absorption rate. This allows the processing circuit 102, 152 to tune a transmission range of the signal. For example, when the signal is transmitted at 60 GHz, the signal may experience peak oxygen absorption, and thus the signal will be rapidly attenuated. The processing circuit 102, 152 may lower the frequency to 58 GHz in order to decrease the attenuation of the transmitted signal and increase the range of the transmitted signal. Other adjustments to the transmission frequency based on the absorption rate are also envisioned.

The absorption rate used by processing circuit 102, 152 may primarily be based on an oxygen absorption model (e.g., an oxygen absorption line, graph, function, etc.). The absorption model may be pre-stored in a database or memory component coupled to the processing circuit 102, 152 and accessible by the processing circuit 102, 152. The model may also be provided and/or updated by an external source and loaded into a component of the system 100 or the processing circuit 102, 152. In an embodiment, the model is a static model and the inputs to the model are dynamic. For example, using various inputs (e.g., temperature, humidity, barometric pressure), the processing circuit 102, 152 can apply them to the model to determine a new frequency or strength for a transmitted signal. In one embodiment, the processing circuit 102, 152 may receive information from an environmental sensor, (e.g., a barometric sensor, an altimeter device, etc.), and apply this information to the model. Using the model, the processing circuit 102, 152 can determine a new frequency or strength for the transmitted signal and adjust accordingly based on the values provided, as absorption rates may be dependent on pressure, altitude, and/or other variables. In general, the model includes information about oxygen absorption of radiofrequency signals, but the model may also include other measures, such as absorption rates due to various atmospheric components (e.g., water vapor), etc. Atmospheric component values may also be provided as inputs to the model.

In an embodiment, the radiofrequency receiver 156 includes a radio antenna. The radiofrequency receiver 156 provides feedback about the transmitted signal received from the radiofrequency transmitter 104 to the processing circuit 102, 152. In some embodiments, the feedback indicates an error rate associated with the received signal or a signal strength of the received signal. The feedback signal can be a request from the receiving device for a signal with a different power level of a frequency change. The processing circuit 102, 152 analyzes the feedback and makes determinations on a new or optimal signal and how to adjust the signal using the atmospheric model. For example, if the feedback indicates that the signal of radiofrequency transmitter 104 is not strong enough at the receiver 150, processing circuit 102, 152 can use the model to determine a new or optimal frequency or strength and adjust the frequency of radiofrequency transmitter 104 accordingly in order to transmit a signal according to the properties of the optimal signal. In some embodiments, the optimal signal is a signal that is less absorbed by the atmosphere, and thus is less attenuated; this may, for example, minimize the power required by the transmitter, or the data error rate for a given transmitted signal power. In other embodiments, the optimal signal is a signal that is more strongly absorbed and thus subject to greater attenuation; this may, for example, reduce the propagation of the radiofrequency signal beyond the receiver location, and thus reduce interference with other EHF systems or reduce the probability that the signal will be detected and intercepted by an enemy.

Figure 2:
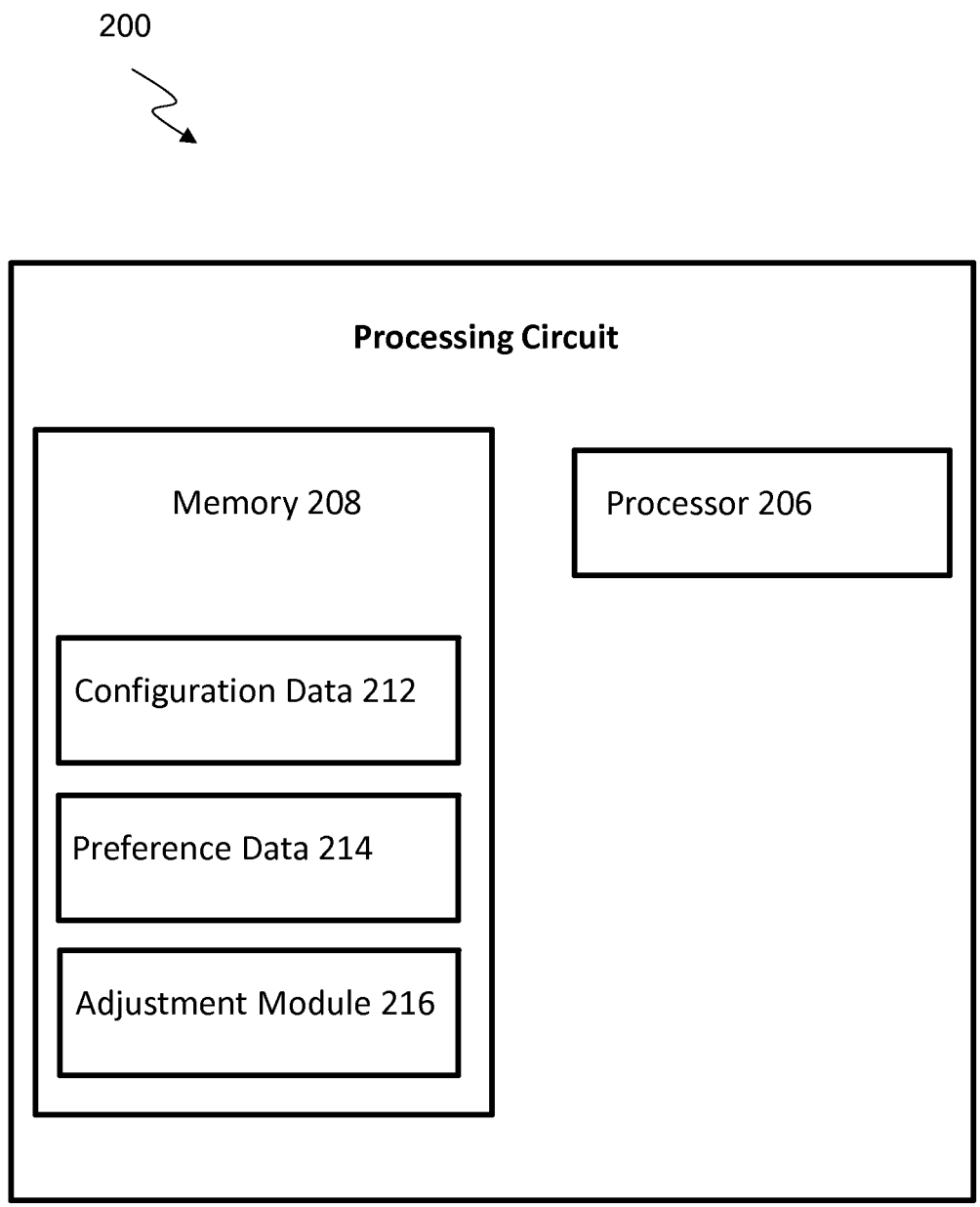
FIG. 2 is a block diagram of a processing circuit for automatically adjusting a radiofrequency link according to an embodiment.

Referring to FIG. 2, a detailed block diagram of processing circuit 200 for completing the systems and methods of the present disclosure is shown according to an embodiment. Processing circuit 200 may be processing circuit 102, 152 of FIG. 1. Processing circuit 200 is generally configured to accept input or information from an outside source (e.g., a radiofrequency transmitter, a radiofrequency receiver, backlink transmitter, etc.). Processing circuit 200 is further configured to receive configuration and preference data. Input data may be accepted continuously or periodically. Processing circuit 200 uses the input data to analyze and monitor a radiofrequency signal (e.g., the signal transmitted by radiofrequency transmitter 104 of FIG. 1) and adjusts at least the frequency or power of the signal in order to optimize a property of the radiofrequency link. For example, processing circuit 200 can receive feedback information about a transmitted signal from a receiver device and make determinations on how to adjust properties of the transmitted signal to achieve an optimal signal. The processing circuit 200 can adjust the frequency of a transmitted signal to reduce atmospheric attenuation of the signal or adjust to increase attenuation to achieve a desired or optimal transmitted signal. The desired or optimal signal can be adjusted to achieve a certain error rate, to increase a transmission range of the signal, to increase a data rate, or to optimize power usage of the transmitter.

Adjustments to the transmitted signal are made relative to an attenuation model, such as an attenuation model relating to atmospheric absorption characteristics and/or an attenuation amount. For example, processing circuit 200 may analyze one or more models or data sources containing information relating to atmospheric absorption as compared to a frequency value. In an embodiment, processing circuit 200 also analyzes the feedback signal and can apply this information to a model to make determinations on appropriate frequency and strength of a transmitted signal. Alternatively, or in addition, processing circuit 200 may determine the actual signal loss (due to atmospheric attenuation plus other effects such as antenna performance) as a function of frequency by commanding the radiofrequency transmitter 104 (and radiofrequency receiver 154) to operate at various frequencies and determining the effect on the received signal, either directly (using signal strength information from receiver 154) or indirectly (e.g., by adjusting the power output of transmitter 104 at each operating frequency to achieve the same overall signal transmission quality as measured by receiver 154). This determination may be done once (e.g., during system setup), periodically, in response to an event (e.g., a change in position of a mobile transmitter or receiver, or a deliberate or accidental shift in the position or orientation of an antenna) or on command, e.g., from a system operator.

According to an embodiment, processing circuit 200 includes processor 206. Processor 206 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 200 also includes memory 208. Memory 208 is one or more devices (e.g., RAM, ROM, Flash Memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to the processor 206 and include computer code or instructions for executing the processes described herein (e.g., the processes shown in FIGS. 4-9).

Memory 208 includes configuration data 212. Configuration data 212 includes data relating to processing circuit 200. For example, configuration data 212 may include information relating to interfacing with other components of a device (e.g., a device of system 100 of FIG. 1). Configuration data 212 may include information as to how often input should be accepted, and may store default values required to initiate communication with peripheral components. Configuration data 212 further includes data to configure communication between the various components of processing circuit 200.

Memory 208 further includes adjustment module 216 for executing the systems and methods described herein. Adjustment module 216 is generally configured to generate commands necessary to adjust and control a radiofrequency transmission. Such commands may include commands necessary to adjust the modulation, frequency, amplitude, and direction of a transmitted signal. Adjustment module 216 may be further configured to operate according to default settings or a user's preferences. In this manner, adjustments can be applied in order to meet a user's needs, and settings can be applied according to change a transmission configuration (e.g., adjust a range configuration, adjust a directional configuration, adjust a data rate configuration, etc.). The adjustment module 216 can receive transmitter data to identify an appropriate frequency or power to use for a signal. For example, transmitter data may include the in-use transmission frequency, directional information, antenna gain, or transmitter power. In some embodiments, the adjustment module 216 can identify a range of the link between the transmitting device and the receiving device. For example, the adjustment module 216 can determine that one end (e.g. the transmitting device, the receiving device) is mobile and can determine changes in the range as the mobile end changes location. The determination can be made in predetermined time periods, such as daily or every minute, or can be determined in real-time. In some embodiments, the adjustment module can request the receiving device re-transmit information such as the feedback signal.

Adjustment module 216 also receives oxygen absorption information. In one embodiment, the absorption information is provided by an oxygen absorption model stored in configuration data 212. The oxygen absorption information includes data for comparing a transmission frequency and the amount of absorption/attenuation caused by atmospheric gases (e.g., oxygen). Adjustment module 216 analyzes the transmitter data, and accesses the oxygen absorption information and adjusts at least the frequency of the transmitted signal based on the absorption values. An initial connection may be established according to a connection signal having predefined characteristics, or a connection may be established by adjusting the signal until feedback is received that indicates another device has received the transmitted signal. Various other connection establishment routines are also envisioned. After a connection is established, adjustments to the frequency and transmitted signal are made with respect to the atmospheric absorption characteristics, and are based on feedback provided from a receiving device and on properties of the radiofrequency link (i.e. a closed-loop process). For example a certain property (or properties) of the radiofrequency link may selected to be optimized (e.g., transmitter power used, transmission rate, error rate, etc.) or a certain objective (or objectives) may be desired. In one scenario, the objective may be to reduce interference of the signal. In another scenario, the objective may be to reduce a probably of interception of the signal. Various objectives and optimizations of the radiofrequency link may have to be traded off against each other. Also, objectives and properties of the radiofrequency link may be fixed for certain configurations.

Combinations of properties may be optimized and more than one may be adjusted by adjustment module 216. A property to be optimized may be stored in configuration data 212, or may be specified by a user and stored in preference data 214. A property may be an independent parameter and explicitly specified regardless of other values. For example, an antenna gain value may be fixed regardless of other changes being made. A property to be optimized may also be a dependent parameter. For example, the transmitter power may be set to a desired minimum level as long as no significant signal interference (or any other specified condition) is detected.

In an embodiment, adjustment module 216 adjusts the transmitter based on feedback received from a receiving device. The feedback may be based on reception characteristics as compared to the transmitted signal. The feedback may be provided by a backlink communication channel (e.g., the feedback signal may be a radiofrequency signal, a cellular signal, a digital signal, may be transmitted via networking protocol or an internet connection, cable modem, WiFi connection, etc., provided by a backlink communication channel). As an example, a receiving device may receive a highly attenuated signal and may provide feedback including information related to the attenuated signal. The receiver device may analyze and determine many characteristics related to the received signal. In one embodiment, the receiver device determines the absolute strength of the received signal. In one embodiment, the receiver device determines a signal-to-noise level. In one embodiment, the receiver device determines a signal-to-clutter level, for example, where interference is in the form of an additional signal (e.g., a signal that is transmitted by a third party, etc.). In one embodiment, the transmitter may transmit a carrier or pilot signal that is not carrying data of the main transmitted signal. In this manner, the receiving device may monitor the carrier or pilot signal to determine a signal strength or signal-to-noise ratio, etc. In one embodiment, the receiving device analyzes the actual data of the transmitted signal to determine an error rate or an error margin of the data. Any of the above discussed analysis and characteristics may be provided by the receiving device as feedback.

As another example, a receiving device may provide feedback that the received signal is very strong, and as such is easily detectable by unintended recipients. In response, adjustment module 216 may decrease the transmission power and/or adjust the transmission frequency to induce attenuation based on the oxygen absorption model and/or stored data on measured loss versus (e.g., as a function of) frequency, and thereby decrease the overall range and strength of the transmitted signal to minimize the probability of detection. As another example, the feedback may include information that the transmitted signal is using frequencies also in use by another spatially-proximate radiofrequency link, resulting in interference to one or both signals. Adjustment module 216 may alter the transmission frequency to resolve the conflict and decrease signal interference. The adjustment module 216 can notify the receiving device of the change in frequency or power of the signal using a command transmitted through a supervisory channel (e.g., lower frequency WiFi connection, internet modem) interfaced with the backlink channel, or using the backlink channel (e.g., the backlink channel may provide an RF connection between the backlink transmitter 156 and the backlink receiver 106; the backlink channel may provide a lower frequency WiFi connection or an internet modem connection between the backlink transmitter 156 and the backlink receiver 106).

In an embodiment, adjustment module 216 accesses a desired signal level (stored in configuration data 212 or preference data 214) and adjusts the transmitter until the desired signal level is obtained. The signal level includes a measure of multiple characteristics of a radiofrequency communication signal (e.g., amplitude, frequency, data rate, attenuation rate, signal-to-noise ratio, etc.). Adjustment module 216 may continuously or periodically apply adjustments until the desired signal is reached. For example, a user may enable a setting to maintain a 1 Gbit/s data transmission rate. Adjustment module 216 may access an oxygen absorption model and/or stored record (e.g., table, database) of loss measurements and analyze feedback related to the received signal to adjust the frequency of the transmission, based on absorption of the current signal frequency as specified by the model, in order to maintain the minimum 1 Gbit/s rate. In the event the data rate falls below 1 Gbit/s, adjustment module 216 may automatically apply an adjustment in an effort to increase throughput (e.g., altering the frequency to reduce attenuation, or increasing transmission power, etc.). In another embodiment, adjustment module 216 adjusts the transmitter according to an open-loop process. For example, adjustment module 216 may adjust a signal according to a model of atmospheric transmission properties (e.g., an oxygen absorption line, etc.) vs. frequency regardless of whether feedback is available (e.g., for initiation a connected where feedback is not yet available, etc.).

In an embodiment, adjustment module 216 increases or decreases the frequency according to a transmitter setting (e.g., a power usage setting, an antenna gain setting, etc.). For example, a power setting or range may be specified, and adjustment module 216 may access an atmospheric absorption model to determine a range of frequencies and their corresponding attenuations that are available to use and remain within the power usage requirement. Based on feedback from a receiving device, adjustment module 216 determines a new frequency for the signal and adjusts the frequency in order to maintain a certain throughput, error rate, etc., while staying within the power usage requirements. Based on the feedback, adjustment module 216 module may also adjust the frequency in order to maintain or optimize a data transmission rate, a signal bandwidth, an error rate, a signal-to-noise-ratio, a signal-to-interference-ratio etc., while staying within the power usage requirements.

In an embodiment, optimization of link properties includes adjustments made to pursuant to an objective. For example, adjustment module 216 may alter the frequency or power of the transmission in order to minimize interference. In this manner, adjustment module 216 may adjust the transmission frequency or power in order to minimize attenuation of the signal by oxygen in the atmosphere. Adjustment module 216 may adjust the frequency or power while consulting feedback provided from a receiving device so that attenuation of the signal does not suppress the primary EHF communications link. In some embodiments, the primary EHF communications link may be accompanied by a proxy (e.g., separate, secondary) signal. The proxy signal may include more, less or different information relative to the primary EHF communications link, such as information about the primary EHF communications link (e.g., signal strength, frequency, other characteristics/properties of the primary EHF communications link). Adjustment module 216 may receive and analyze the proxy signal and/or receive feedback based on the proxy signal in order to adjust the frequency or power of the transmission.

In an embodiment, adjustment module 216 alters the frequency or power in order to induce interference or to maintain covertness. In this manner, adjustment module 216 may increase the transmission frequency or power to a value corresponding with increased (or maximum) oxygen attenuation. Adjustment module 216 may adjust the frequency or power while consulting feedback provided from a receiving device so that attenuation of the signal does not entirely suppress communications although some attenuation of the signal is present. This may be desirable in a scenario where a receiving device is nearby, and only a short range transmission is needed. In this manner, the probably of signal interception can be minimized by using such a short range and attenuated signal. Prior to adjusting the frequency or power, adjustment module 216 may determine an initial transmission strength to be used based on a configuration setting, or based on the location of the receiving device. Adjustment module 216 may then adjust the transmission strength in conjunction with adjustments to the frequency or power to achieve a desired signal. Alternatively, the transmission strength may be a fixed value.

Adjustment module 216 may increase or decrease the frequency of the signal to minimize the attenuation of the signal and the error rate. An allowable minimum error rate or error rate range may be specified by configuration data 212 or preference data 214. In some scenarios, it may be desirable to decrease the error rate to a rate that is not necessarily an overall minimum (e.g., where attenuation of the signal is also the minimum). For example, adjustment module 216 may be concurrently configured to decrease the probability of interception of the signal, and therefore, some attenuation of the signal may be desired. In this manner, adjustment module 216 may adjust the frequency or power of the signal to decrease the current error rate, yet still maintain a level of signal attenuation.

Other transmitter parameters may be adjusted or specified by adjustment module 216 in addition to adjusting the frequency or power of the transmission as described herein. As another example, adjustment module 216 may alter the antenna gain of the transmitter's antenna. As another example, adjustment module 216 may alter the directional positioning of an antenna of the transmitter. This may include generating signals to invoke a mechanical adjustment of the antenna. The antenna may be translated, raised, lowered, tilted, or otherwise adjusted via mechanical means. After such adjustment of transmitter parameters, the frequency (and thereby attenuation) of the signal may be adjusted based on an atmospheric model and feedback from a receiving device.

In an embodiment, adjustment module 216 adjusts the transmitter as described herein, and further bases an adjustment on a sensed environmental condition. A radiofrequency link system (e.g., system 100 of FIG. 1) may include various sensors that are communicably coupled to processing circuit 200 and provide data related to environmental conditions and atmospheric absorption. For example, system 100 may include a barometric sensor, a humidity sensor, a precipitation (e.g., rainfall) sensor, oxygen sensors, etc. Additionally, a sensor may be configured to receive atmospheric absorption data from another device that is separate from the radiofrequency link system (e.g., a weather service, an external control center, etc.). Sensor information is provided to adjustment module 216, which may augment adjustments made to the transmitted signal based on the sensor values. As an example, the propagation characteristics of signals near the 60 GHz band are subject to high amounts of rain attenuation. In a scenario where rainfall is detected, adjustment module 216 may alter the frequency of the transmitted signal to account for attenuation from the rain such that the transmission is not frustrated. In another scenario, where system 100 is located at a high altitude, and oxygen is less dense in the atmosphere, adjustment module 216 may adjust the frequency of transmission to account for the decreased level of oxygen attenuation.

In an embodiment, adjustment module 216 generates frequency tracking commands. The frequency tracking commands include information relating to adjustments made to the frequency of a transmitted signal. The frequency tracking commands instruct a receiving device on how to track the signal as it is adjusted by adjustment module 216. For example, this information may be transmitted to the receiving device via a supervisory channel prior to adjustment of a signal. In this manner, receiving devices may track the signal automatically by following the instructions. For example, adjustment module 216 may adjust the transmission frequency to 58.1 GHz and generate a corresponding frequency tracking command that instructs a receiving device to "tune to 58.1 GHz to continue receiving the signal." Frequency tracking commands may be formatted or structured according to any appropriate format. In an embodiment, adjustment module 216 alters the transmitted signal to embed the frequency tracking command along with the regular communications being transmitted. In another embodiment, adjustment module 216 formats the command for transmission over a separate communications channel. For example, the frequency tracking command may be output via output 204 and sent to a communications device for transmission via an internet or cellular connection.

Referring generally to FIGS. 3-9, various schematic diagrams and processes are shown and described that may be implemented using the systems and methods described herein. The schematic diagrams and processes may be implemented using the system 100 of FIG. 1 and processing circuit 200 of FIG. 2.

Figure 3:
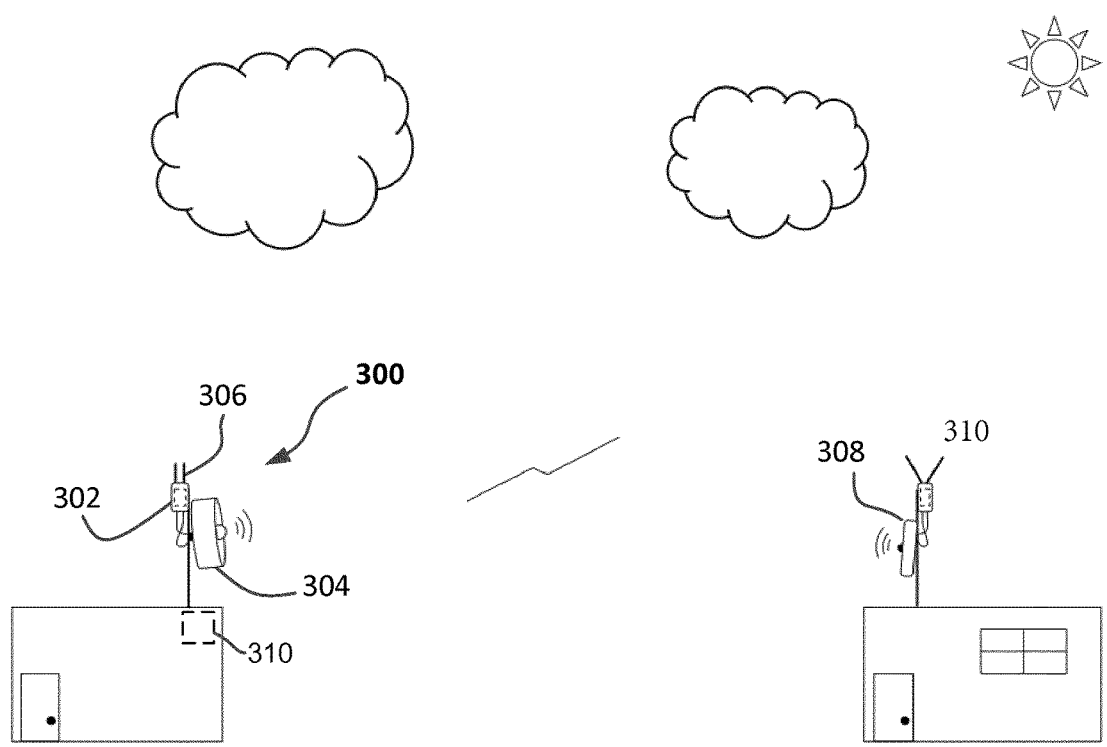
FIG. 3 is a schematic diagram of an automatically adjusting radiofrequency link according to an embodiment.

Referring to FIG. 3, an automatically adjusting radiofrequency link 300 is shown according to an embodiment. Radiofrequency link 300 includes a radiofrequency transmitter 304, a receiving device 308, and a processing circuit 302. The radiofrequency transmitter 304 includes a backlink receiver 306 and a sensor device 310. In one embodiment, sensor devices 310 are also communicably coupled to processing circuit 302. The receiving device 3008 includes a backlink transmitter 310. The receiving device 308 may be any receiving device that is configured to receive an EHF signal and provide feedback to the radiofrequency transmitter 304. The feedback can be a request for a new signal with a different frequency or power, such as a higher frequency or power. The feedback is provided using a backlink connection between the receiving device 308 and the radiofrequency transmitter 304. For example, the back link transmitter 310 on the receiver 308 can transmit the feedback signal to the back link receiver 306 on the radiofrequency transmitter 304 using the backlink channel.

Processing circuit 302 uses the feedback to determine an optimal or required signal to meet the request from the receiving device 308. The processing circuit 302 can compare the optimal signal to the atmospheric absorption model and determine the adjustments needed for the frequency or power (and other properties) of the transmitted signal and radiofrequency link 300 accordingly. Additionally, the signal generated by radiofrequency transmitter 304 may include tracking commands that instruct receiving device 308 how to track the signal. The processing circuit 302 can transmit a command to the receiving device 308 indicating the change in frequency or power of the signal using the a supervisory channel (e.g., lower frequency WiFi connection, internet cable modem) interfaced with the backlink channel, or using the backlink channel (e.g., the backlink channel may provide an RF connection between the backlink transmitter 310 and the backlink receiver 306; the backlink channel may provide a lower frequency WiFi connection or an internet modem connection between the backlink transmitter 310 and the backlink receiver 306). In some embodiments, the command is sent prior to the signal being adjusted to alert the receiving device 308 to the upcoming changes.

In one embodiment, processing circuit 302 is configured to analyze a received beacon/probe signal that may be transmitted from a receiving device (e.g., receiving device 308). Upon receiving the beacon signal (e.g., via backlink receiver 306 or other receiving components), processing circuit 302 may determine the amplitude, signal-to-noise level, or other characteristics of the received beacon signal which are used as feedback (i.e., any of the signal characteristics discussed herein may be determined with respect to the received beacon signal). Based on measurements and analysis performed by processing circuit 302 related to the received beacon signal, processing circuit 302 can determine the atmospheric properties that exist between radiofrequency transmitter 304 and receiving device 308. In this manner, processing circuit 302 may generate the feedback (as compared to receiving the feedback from receiving device 308) that is used to adjust the frequency (and other properties) of the transmitted signal and radiofrequency link 300. In one embodiment, processing circuit 302 may both generate feedback related to a received beacon signal, and receive feedback related to the transmitted signal as provided by receiving device 308.

In one embodiment, processing circuit 302 is configured to analyze data from additional sensor devices located at (or near) the transmitter end of the link (e.g., radiofrequency transmitter 304). For example, sensor devices 310 may include a barometric sensor, a humidity sensor, a precipitation (e.g., rainfall) sensor, oxygen sensors, etc. In this embodiment, processing circuit 302 can be configured to operate and adjust radiofrequency transmitter 304 independently of feedback provided from a receiving end of the link (e.g., feedback related to a received signal as provided by receiving device 308). For example, a barometer and rainfall sensor may be included in sensor devices 310. Processing circuit 302 may monitor data from the sensors and determine a barometer value has increased from a previous reading, which indicates that the local partial pressure of oxygen has increased, combined with a constant or decreasing local temperature reading, this may indicate an increase in local oxygen density. In response, processing circuit 302 may cause the transmitter power to increase, or processing circuit 302 may adjust the frequency of transmission to a frequency where there is less attenuation caused by the increase of oxygen. In this manner, adjustments to the transmitter can be made based on a model of the atmosphere which is informed by measured properties of the atmosphere.

Figure 4:
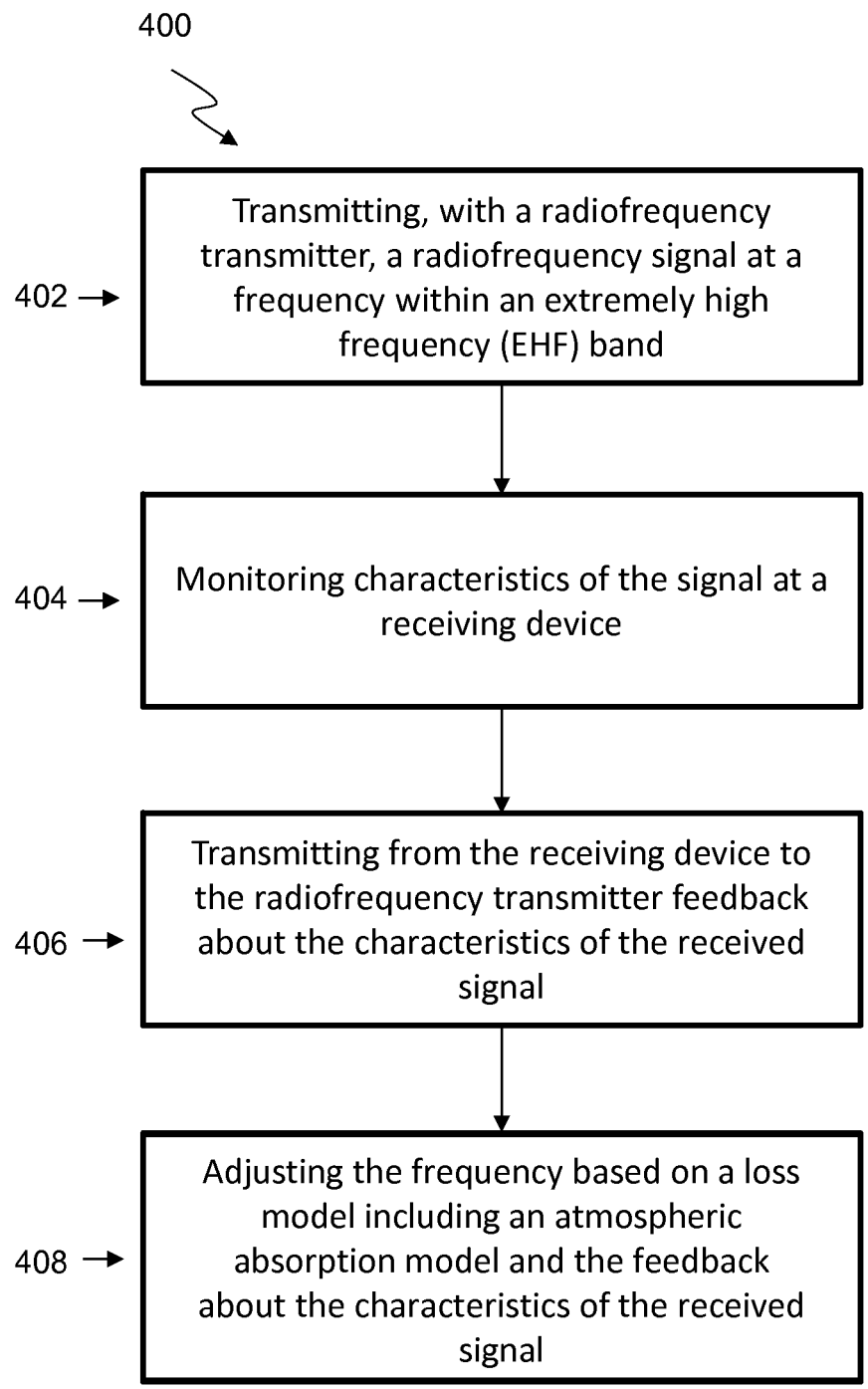
FIG. 4 is a flowchart of a process for automatically adjusting a radiofrequency link according to an embodiment.

Referring to FIG. 4, a flow diagram of a process 400 for automatically adjusting a radiofrequency link, is shown, according to an embodiment. In alternative embodiments, fewer, additional, and/or different steps may be performed. Also, the use of a flow diagram is not meant to be limiting with respect to the order of steps performed. Process 400 includes transmitting, with a radiofrequency transmitter, a radiofrequency signal at a frequency within an extremely high frequency (EHF) band (402), monitoring characteristics of the signal at a receiving device (404), transmitting from the receiving device to the radiofrequency transmitter feedback about the characteristics of the received signal (406), and adjusting the frequency based on a loss model including an atmospheric absorption model and the feedback about the characteristics of the received signal (408).

In more detail, a radiofrequency transmitter transmits a radiofrequency signal at a frequency within the EHF band to a receiving device. In some embodiments, the frequency of the transmitted signal can range from about 30 GHF to about 300 GHF. Radio signals in this band can suffer from atmospheric attenuation as they are transmitted from the transmitter to the receiving device. The atmospheric attenuation can affect the quality (e.g., strength) of the signal received at the receiving device. To detect the quality of the received signal, characteristics and properties of the signal are monitored at the receiving device. These characteristics and properties can include signal power, signal strength, error rate information, and interference levels. For example, in some embodiments, a determination can be made that the received signal was only at half strength when received. In other embodiments, error rate information for the signal is detected at the receiving device.

The receiving device can transmit the signal characteristics to the radiofrequency transmitter. In some embodiments, the receiving device can transmits a request (e.g., feedback signal) to a processing device on the radio frequency transmitter for a new signal, such as a signal with a different frequency or different power level. The processing circuit can be communicatively coupled to the receiving device and the radiofrequency transmitter. In some embodiments, the processing circuit can be executing on and be a component of the receiving device. In other embodiments, the processing circuit can be executing on a component of the radiofrequency transmitter, but be in communication with the receiving device. The receiving device can transmit the request or feedback signal to the processing device though a backlink communications channel. For example, a backlink transmitter on the receiving device can transmit the feedback signal to a backlink receiver on the radiofrequency transmitter. The processing circuit can use the request to determine adjustments needed to achieve an optimal or a required signal. The processing circuit can analyze an atmospheric absorption model to determine a new frequency or new power level needed to achieve the optimal or the required signal. For example, the frequency and/or power of the signal can be shifted up to a region with more attenuation or a shifted down to a region with less attenuation.

In some embodiments, the signal can be shifted to a region with a lower attenuation. To accomplish this, the power of the signal can be transmitted with a lower power. The lower power at the transmitter results in a signal transmitted at a wavelength with less attenuation, raising the power of the signal received at the receiving device. In other embodiments, the signal can be shifted to a region with higher attenuation. To accomplish this, the signal can be transmitted with a higher power and result in a lower power at the receiving device, as well as an ever lower power at a device beyond the receiving device. The higher power at the transmitter results in a signal transmitted at a wavelength with more attenuation, lowering the power of the signal received at the receiving device.

In some embodiments, to adjust the frequency, the processing device makes a choice of minimizing signal power beyond the intended receiving device versus minimizing signal power at the intended signal receiving device. For example, the processing device may adjust the frequency by minimize the interference of the signal. The processing device can adjust the frequency to minimize a probability of interception or minimize a probability of detection of the signal. For example, to protect against eavesdropping at a location beyond the receiving device, the signal is adjusted minimize the probability of interception or interference of the signal.

Figure 5:
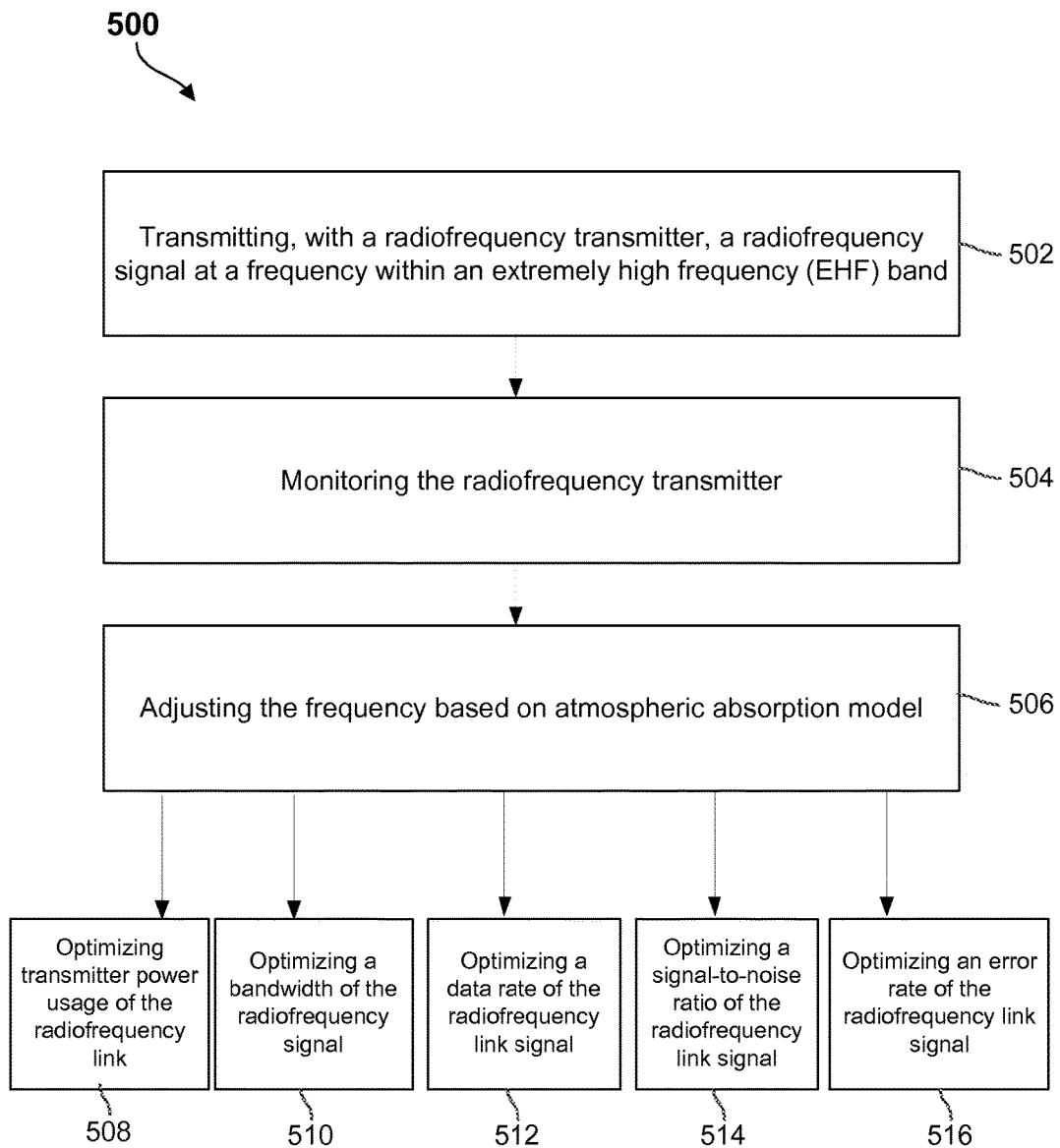
FIG. 5 is a flowchart of a process for automatically adjusting a radiofrequency link according to an embodiment.

Referring to FIG. 5, a flow diagram of a process 500 for automatically adjusting a radiofrequency link, is shown, according to an embodiment. In alternative embodiments, fewer, additional, and/or different steps may be performed. Also, the use of a flow diagram is not meant to be limiting with respect to the order of steps performed. Process 500 includes transmitting, with a radiofrequency transmitter, a radiofrequency signal at a frequency within an extremely high frequency (EHF) band (502), monitoring the radiofrequency transmitter (504), and adjusting the frequency based on atmospheric absorption model (506). The frequency may be adjusted in order to optimize transmitter power usage of the radiofrequency link (508), optimize a bandwidth of the radiofrequency signal (510), optimize a data rate of the radiofrequency link signal (512), optimize a signal-to-noise ratio of the radiofrequency link signal (514), and optimize an error rate of the radiofrequency link signal (516).

Figure 6:
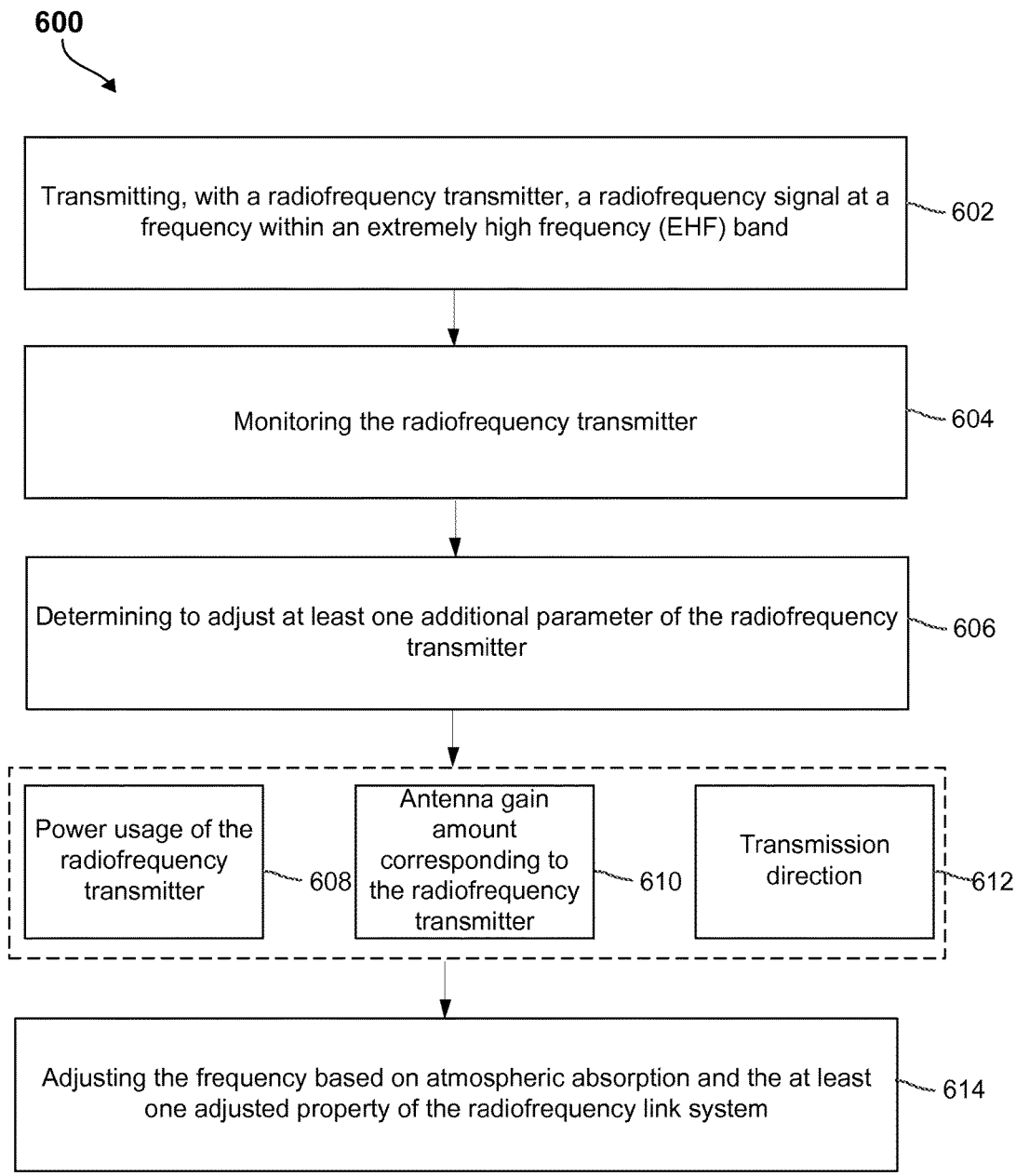
FIG. 6 is a flowchart of a process for automatically adjusting a radiofrequency link according to an embodiment.

Referring to FIG. 6, a flow diagram of a process 600 for automatically adjusting a radiofrequency link, is shown, according to an embodiment. In alternative embodiments, fewer, additional, and/or different steps may be performed. Also, the use of a flow diagram is not meant to be limiting with respect to the order of steps performed. Process 600 includes transmitting, with a radiofrequency transmitter, a radiofrequency signal at a frequency within an extremely high frequency (EHF) band (602), monitoring the radiofrequency transmitter (604), and determining to adjust at least one additional parameter of the radiofrequency transmitter (606). The parameter of the radiofrequency transmitter may include the power usage of the radiofrequency transmitter (608), antenna gain amount corresponding to the radiofrequency transmitter (610), and a transmission direction (612). Then, the frequency is adjusted based on atmospheric absorption and the at least one adjusted property of the radiofrequency link system (614).

Figure 7:
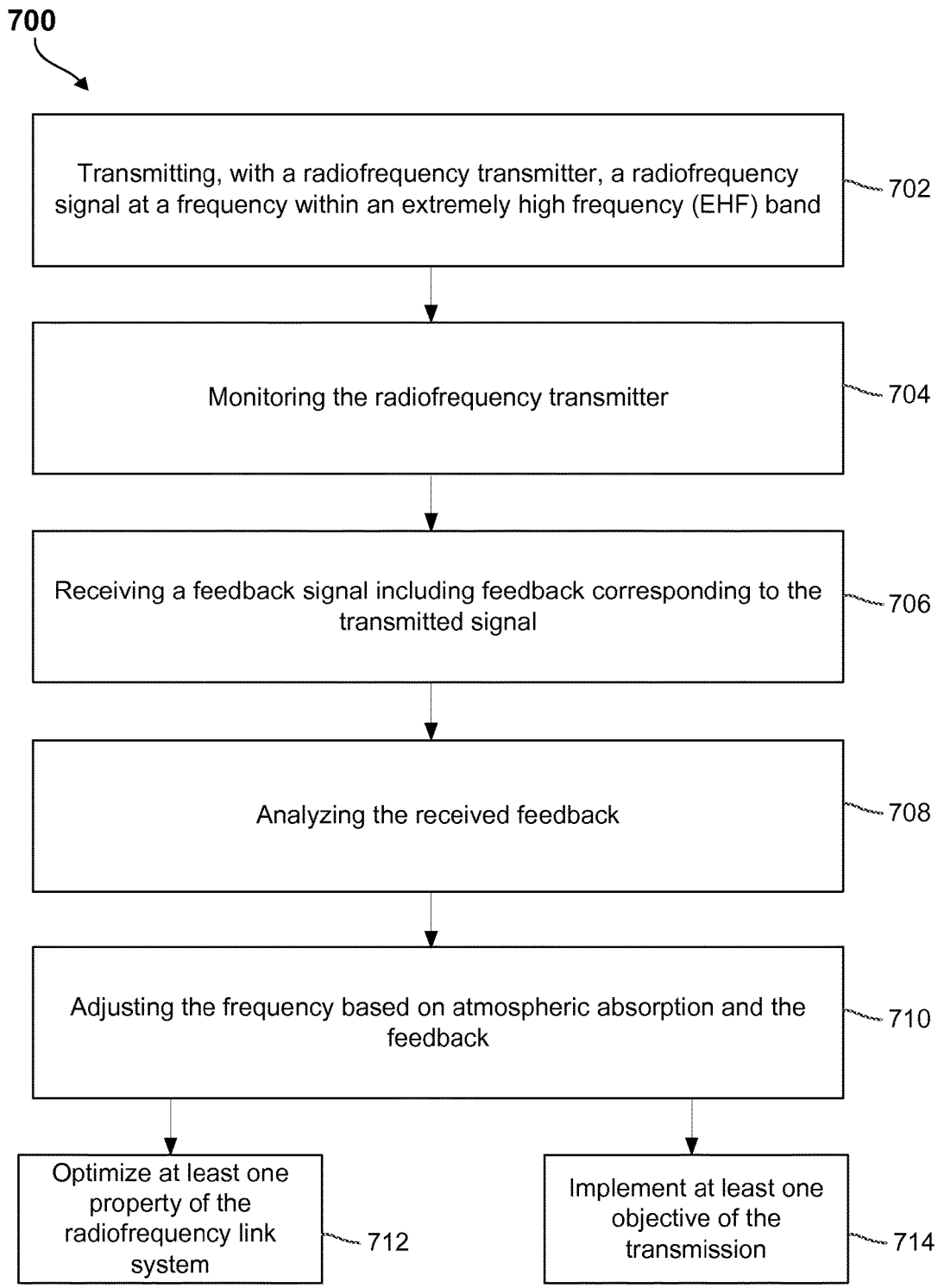
FIG. 7 is a flowchart of a process for automatically adjusting a radiofrequency link according to an embodiment.

Referring to FIG. 7, a flow diagram of a process 700 for automatically adjusting a radiofrequency link, is shown, according to an embodiment. In alternative embodiments, fewer, additional, and/or different steps may be performed. Also, the use of a flow diagram is not meant to be limiting with respect to the order of steps performed. Process 700 includes transmitting, with a radiofrequency transmitter, a radiofrequency signal at a frequency within an extremely high frequency (EHF) band (702), monitoring the radiofrequency transmitter (704), receiving a feedback signal including feedback corresponding to the transmitted signal (706), analyzing the received feedback (708), and adjusting the frequency based on atmospheric absorption and the feedback (710) to optimize at least one property of the radiofrequency link system (712) or to implement at least one objective of the transmission (e.g., minimizing the chance of interception, etc.) (714).

Figure 8:
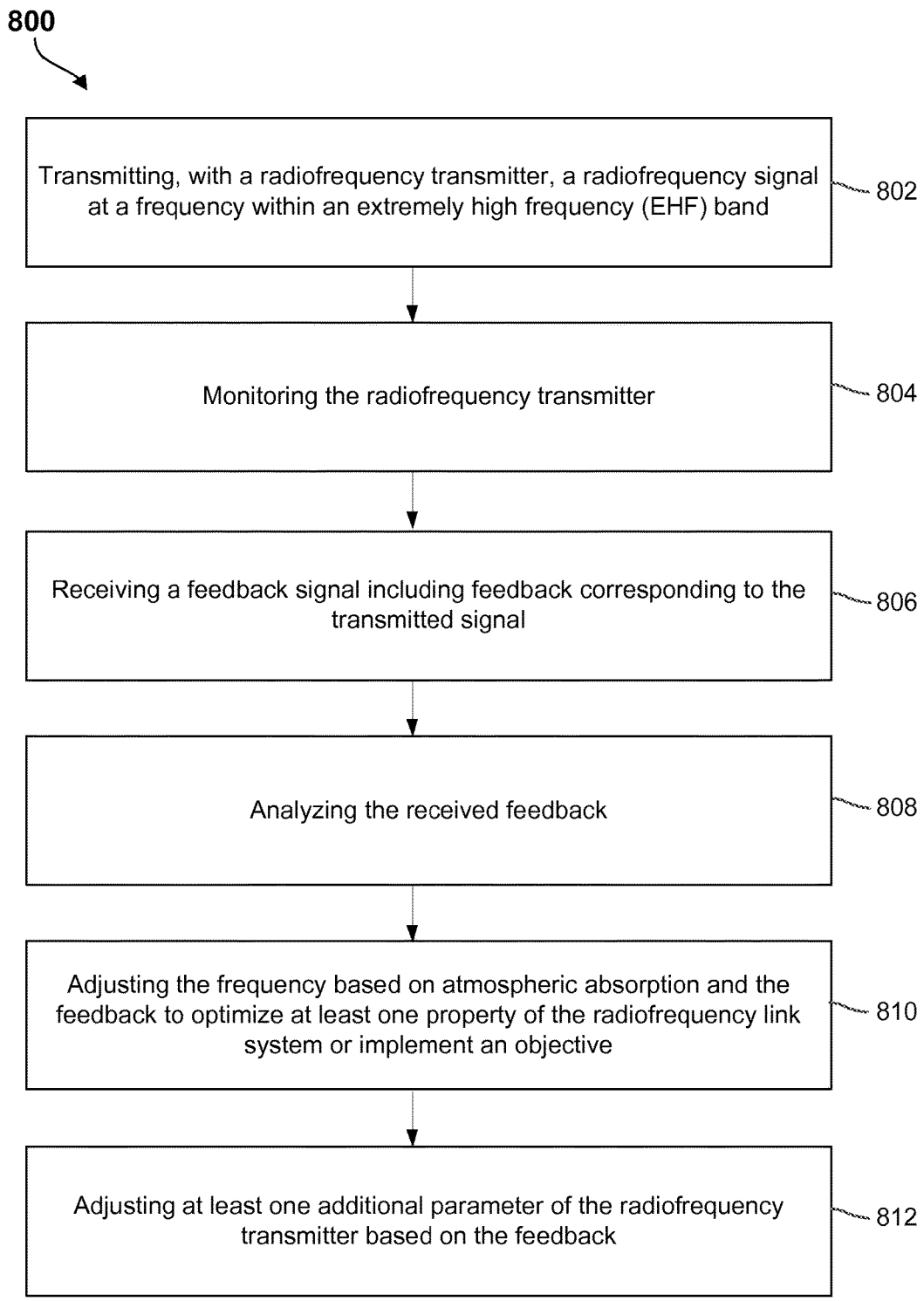
FIG. 8 is a flowchart of a process for automatically adjusting a radiofrequency link according to an embodiment.

Referring to FIG. 8, a flow diagram of a process 800 for automatically adjusting a radiofrequency link, is shown, according to an embodiment. In alternative embodiments, fewer, additional, and/or different steps may be performed. Also, the use of a flow diagram is not meant to be limiting with respect to the order of steps performed. Process 800 includes transmitting, with a radiofrequency transmitter, a radiofrequency signal at a frequency within an extremely high frequency (EHF) band (802), monitoring the radiofrequency transmitter (804), receiving a feedback signal including feedback corresponding to the transmitted signal (806), analyzing the received feedback (808), adjusting the frequency based on atmospheric absorption and the feedback to optimize at least one property of the radiofrequency link system or implement an objective (810), and adjusting at least one additional parameter of the radiofrequency transmitter based on the feedback (812).

Figure 9:
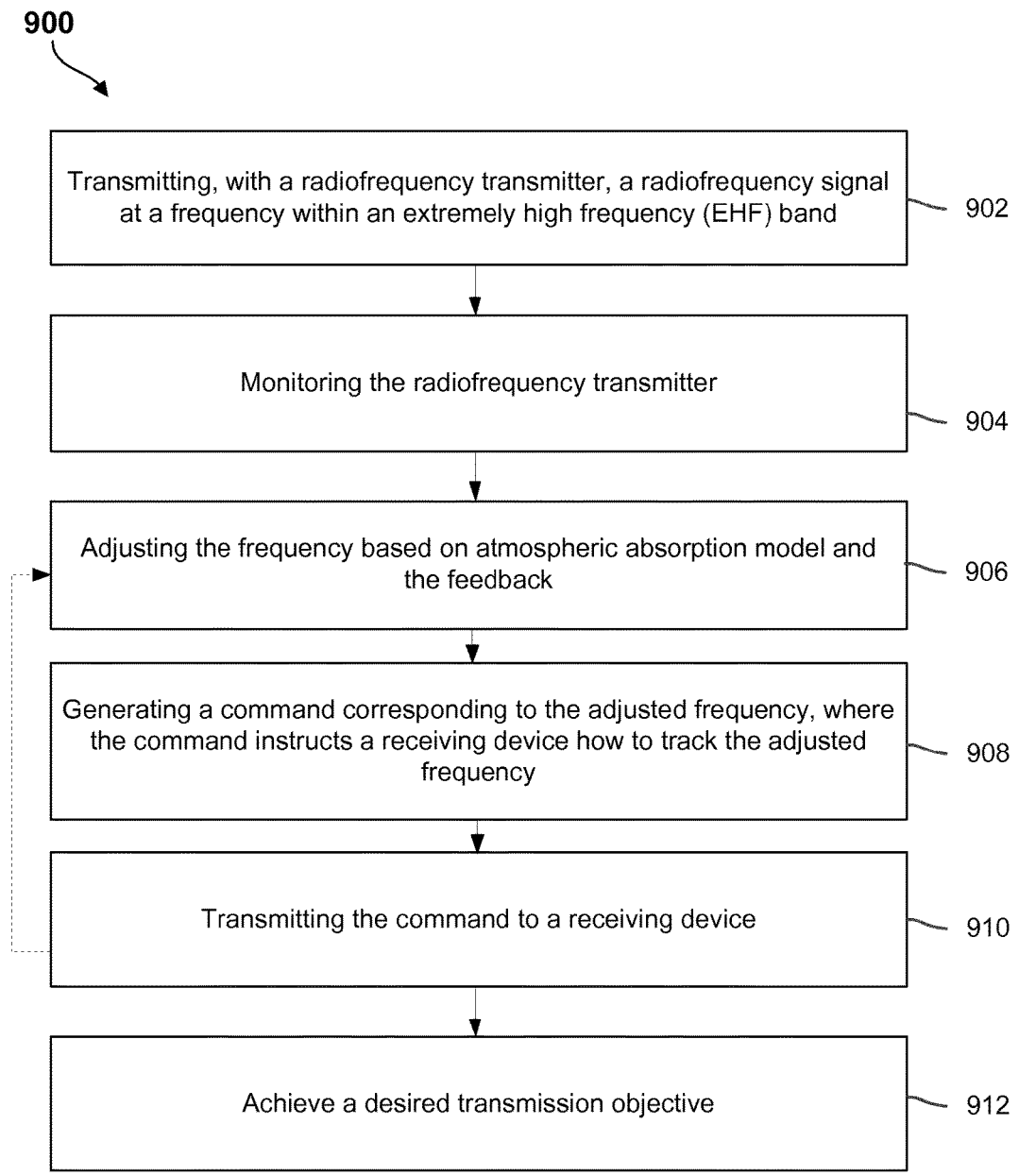
FIG. 9 is a flowchart of a process for automatically adjusting a radiofrequency link according to an embodiment.

Referring to FIG. 9, a flow diagram of a process 900 for automatically adjusting a radiofrequency link, is shown, according to an embodiment. In alternative embodiments, fewer, additional, and/or different steps may be performed. Also, the use of a flow diagram is not meant to be limiting with respect to the order of steps performed. Process 900 includes transmitting, with a radiofrequency transmitter, a radiofrequency signal at a frequency within an extremely high frequency (EHF) band (902), monitoring the radiofrequency transmitter (904), adjusting the frequency until based an atmospheric absorption model and based on the feedback (906), generating a command corresponding to the adjusted frequency, where the command instructs a receiving device how to track the adjusted frequency (e.g. includes information relating to the adjustments made to the frequency) (908), and transmitting the command to a receiving device (e.g., embedding the command in the radiofrequency signal or transmitting the command separately, etc.) (910). The frequency of the transmitted signal may be adjusted in this manner until a desired transmission objective is achieved or a transmission characteristic is realized (e.g., maintaining a certain data rate, minimizing an error rate, etc.) (912).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. An automatically adjustable radiofrequency link system, comprising:
    a radiofrequency transmitter configured to:
        transmit a first signal at a first frequency of transmission within an extremely high frequency (EHF) band to establish an initial connection with a receiving device;
        receive feedback from the receiving device or a remote source regarding the first signal, the feedback indicating a desired operating mode for the radiofrequency transmitter;
        determine signal loss properties including an effect of atmospheric absorption as a function of frequency;
        determine a modification to the first signal using the feedback and the signal loss properties; and
        transmit a second signal at a second frequency of transmission within the EHF band based on the determined modification to the first signal.

2. The automatically adjustable radiofrequency link system of claim 1, wherein the feedback indicates whether there is a risk of communications being intercepted or otherwise compromised, and the radiofrequency transmitter is configured to determine the modification to the first signal by:
    responsive to the feedback indicating that there is not a risk of communications being intercepted or otherwise compromised, at least one of (1) adjusting the first signal to operate at a frequency corresponding to relatively low or minimum absorption or (2) optimizing a power usage by the radiofrequency transmitter; and
    responsive to the feedback indicating that there is a risk of communications being intercepted or otherwise compromised, at least one of (1) adjusting the first signal to operate at a frequency corresponding to relatively high or maximum absorption or (2) minimizing a range of the first signal so that the receiving device is located at a maximum range of the second signal.

3. The automatically adjustable radiofrequency link system of claim 1, wherein the desired operating mode for the radiofrequency transmitter is a low power mode in which the radiofrequency transmitter determines the modification to be a decrease in strength of the first signal.

4. The automatically adjustable radiofrequency link system of claim 1, wherein the signal loss properties are determined in part from a model of atmospheric absorption properties versus frequency.

5. The automatically adjustable radiofrequency link system of claim 4, wherein the atmospheric absorption properties are based on absorption due to oxygen molecules in the atmosphere.

6. The automatically adjustable radiofrequency link system of claim 1, wherein the feedback indicates an error rate associated with the first signal or a signal strength of the first signal.

7. The automatically adjustable radiofrequency link system of claim 1, wherein determining the modification includes maintaining or optimizing at least one of a data transmission rate, a signal bandwidth, an error rate, a signal to noise ratio, or a signal to interference ration, while staying within a power usage range.

8. The automatically adjustable radiofrequency link system of claim 1, wherein the radiofrequency transmitter determines the modification further based on a sensed environmental condition received from a sensor.

9. The automatically adjustable radiofrequency link system of claim 1, wherein the radiofrequency transmitter is further configured to transmit a supervisory signal via a supervisory channel.

10. The automatically adjustable radiofrequency link system of claim 1, wherein EHF band includes frequencies from 57 GHz to 64 GHz.

11. A method, comprising:
    transmitting a first signal at a first frequency of transmission within an extremely high frequency (EHF) band to establish an initial connection with a receiving device;
    receiving feedback from the receiving device or a remote source regarding the first signal, the feedback indicating a desired operating mode for the radiofrequency transmitter;
    determining signal loss properties including an effect of atmospheric absorption as a function of frequency;
    determining a modification to the first signal using the feedback and the signal loss properties; and
    transmitting a second signal at a second frequency of transmission within the EHF band based on the determined modification to the first signal.

12. The method of claim 11, wherein the feedback indicates whether there is a risk of communications being intercepted or otherwise compromised, and determining the modification to the first signal includes:
    responsive to the feedback indicating that there is not a risk of communications being intercepted or otherwise compromised, at least one of (1) adjusting the first signal to operate at a frequency corresponding to relatively low or minimum absorption or (2) optimizing a power usage by the radiofrequency transmitter; and
    responsive to the feedback indicating that there is a risk of communications being intercepted or otherwise compromised, at least one of (1) adjusting the first signal to operate at a frequency corresponding to relatively high or maximum absorption or (2) minimizing a range of the first signal so that the receiving device is located at a maximum range of the second signal.

13. The method of claim 11, wherein the desired operating mode for the radiofrequency transmitter is a low power mode in which the modification is a decrease in strength of the first signal.

14. The method of claim 11, wherein the signal loss properties are determined in part from a model of atmospheric absorption properties versus frequency.

15. The method of claim 14, wherein the atmospheric absorption properties are based on absorption due to oxygen molecules in the atmosphere.

16. The method of claim 11, wherein the feedback indicates an error rate associated with the first signal or a signal strength of the first signal.

17. The method of claim 11, wherein determining the modification includes maintaining or optimizing at least one of a data transmission rate, a signal bandwidth, an error rate, a signal to noise ratio, or a signal to interference ration, while staying within a power usage range.

18. The method of claim 11, further comprising transmitting a supervisory signal via a supervisory channel.

19. The method of claim 11, further comprising received a sensed environmental condition from a sensor and determining the modification based on the sensed environmental condition.

20. The method of claim 11, wherein EHF band includes frequencies from 57 GHz to 64 GHz.

* * * * *